Figure 3:
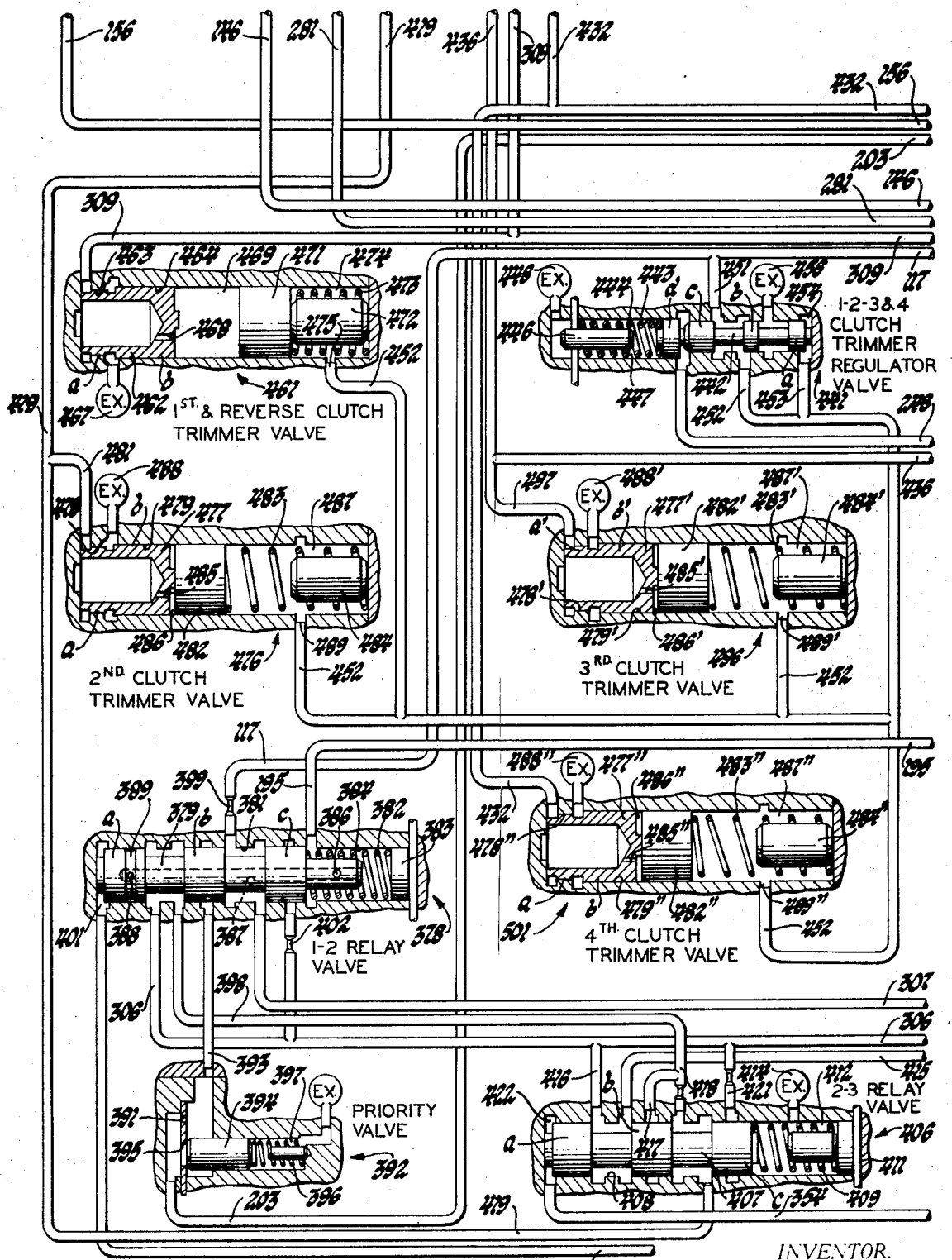

United States Patent [19]
Edmunds

[11] 3,713,354
[45] Jan. 30, 1973

[54] TRANSMISSION AND CONTROL
[75] Inventor: John O. Edmunds, Indianapolis, Ind.
[73] Assignee: General Motors Corporation, Detroit, Mich.
[22] Filed: Jan. 8, 1971
[21] Appl. No.: 104,867

[52] U.S. Cl. ..................74/732, 74/753, 74/688, 74/759, 74/869
[51] Int. Cl......F16h 47/00, F16h 57/10, F16h 47/08
[58] Field of Search.........74/753, 731, 759, 688, 732

[56] References Cited

UNITED STATES PATENTS

| | | | |
|---|---|---|---|
| 3,096,666 | 7/1963 | Christenson et al. | 74/645 |
| 3,252,352 | 5/1966 | General et al. | 74/645 |
| 3,523,468 | 8/1970 | Kepner | 74/759 |

Primary Examiner—Arthur T. McKeon
Attorney—W. E. Finken, A. M. Heiter and D. F. Scherer

[57] ABSTRACT

A transmission and control having a fluid or mechanical drive input in the forward gear ratios and a mechanical drive input in reverse gear ratios. The control, for controlling the engagement of a low-reverse brake when the transmission operation is changed for neutral or forward or reverse drive, has a shift valve responsive to a relay valve controlled by a manual valve. The relay valve responds to movement of the manual valve from neutral to forward or reverse drive to actuate the shift valve thereby directing fluid to engage the low-reverse brake. The control may be operated to selectively provide a mechanical input drive in the first ratio also.

5 Claims, 6 Drawing Figures

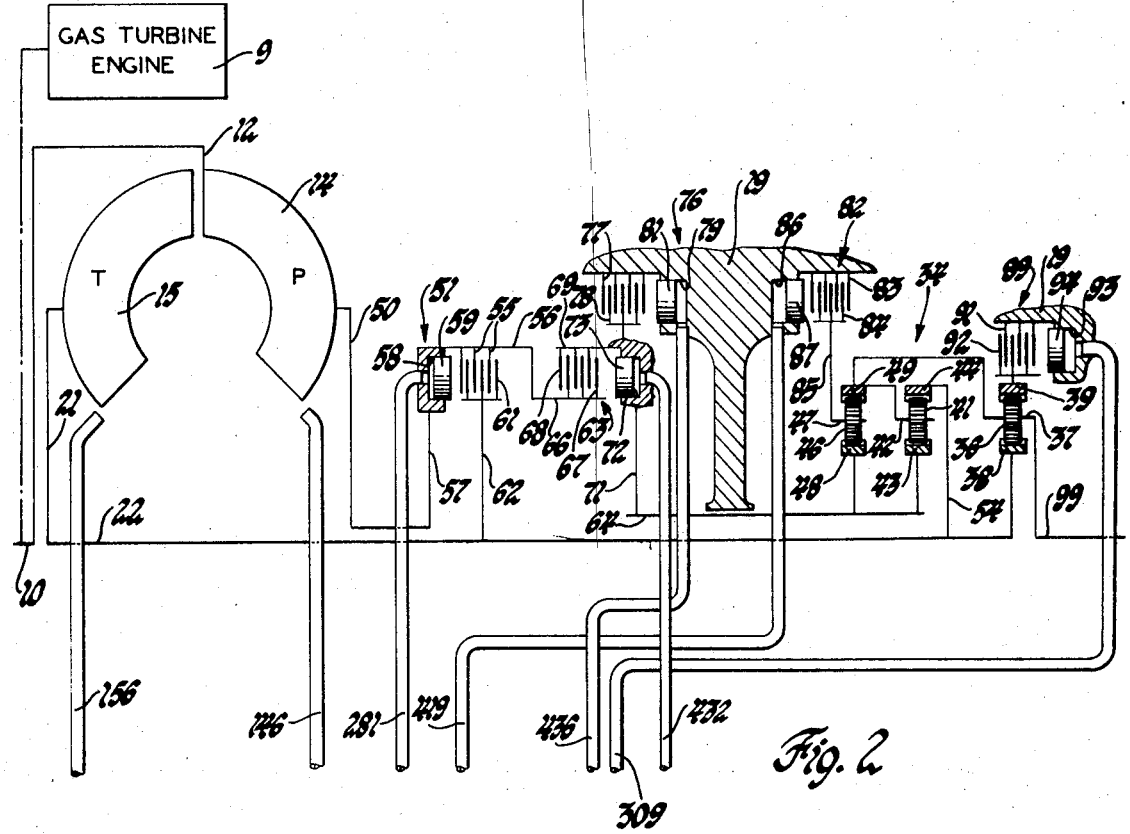

TRANSMISSION AND CONTROL

This invention is related to multiratio transmissions and controls and more particularly to transmissions having a fluid or mechanical drive input in all forward ratio and a mechanical drive input in reverse.

This invention is adaptable for use with a gas turbine engine wherein the power turbine is not continuously driven during operation. With engines of this type it is possible to stall the power turbine when the vehicle being driven is stationary with the transmission conditioned for a forward or reverse drive. The present invention however includes a fluid coupling drive connected between the gas turbine engine and the planetary gearing to permit the power turbine to rotate when the transmission gearing is conditioned for forward first speed drive.

When the transmission is in neutral the control system is operative to disengage all of the friction drive establishing devices associated with the planetary gearing so that the engine and coupling rotate freely. A manual selector valve is provided to permit the operator to shift from neutral to a forward or reverse drive. When a forward or reverse drive is selected by the operator the manual valve provides a shift signal to a neutral-first relay valve which causes the valve member to shift against a bias spring. A neutral to first shift signal valve controls a pressure bias on a neutral to first relay valve such that when the shift signal valve is shifted in response to the selector valve the pressure bias on the relay valve is exhausted permitting the relay valve to move to the drive position. In the drive position the shift valve directs fluid pressure to the low-reverse brake in a transmission to condition the transmission for a forward drive when the reverse clutch is disengaged or for a reverse drive when the reverse clutch is engaged. In first gear forward, in the preferred embodiment, the fluid coupling provides a fluid drive between the engine input and the planetary gearing to provide a slipping connection therebetween when the vehicle is initially accelerated. After the vehicle has reached a predetermined speed a lock-up clutch in the transmission is engaged to provide a direct mechanical connection from the engine to the planetary gearing. The lock-up clutch may be selectively engaged in first gear also. In reverse drive a fourth speed or reverse clutch is engaged to provide a mechanical drive directly between the engine and the planetary gearing.

It is an object of this invention to provide in an improved transmission and control a planetary gearing arrangement having a fluid drive in the first forward drive ratio and a mechanical drive input in all other drive ratios including reverse.

It is another object of this invention to provide in an improved transmission and control a planetary gearing arrangement having a fluid input in forward drive and a mechanical input in reverse drive and control valve means for engaging a drive establishing device when either a reverse or forward drive condition is established from a neutral condition.

These and other objects and advantages of the present invention will be more apparent from the following description and drawings of the preferred embodiment in which:

FIG. 1 is a block diagram showing the arrangement of FIGS. 2, 3, 4, 5 and 6; and FIGS. 2, 3, 4, 5 and 6 when arranged according to FIG. 1 schematically show the gearing and control of the transmission.

Referring to the drawing, FIG. 2 shows a gas turbine engine 9 driving the power train having an input shaft 10 driving a rotary hydraulic coupling housing 12 which drives the pump 14. The pump hydrokinetically drives the turbine 15 which is connected by a hub 21 to the coupling output shaft 22.

The four speed gear unit generally designated 34 has three planetary gear sets to provide four forward speeds and a reverse which are hereinafter referred to as first to fourth and reverse. The first gear set of the four speed unit 34 has planetary pinions 36 mounted on a carrier 37 and meshing with sun gear 38 and ring gear 39, the second having pinions 41 rotatably mounted on carrier 42 and meshing with sun gear 43 and ring gear 44 and the third having planetary pinions 46 mounted on the carrier 47 and meshing with sun gear 48 and ring gear 49.

A forward clutch 51 is engaged in all forward ratios except first and connects the coupling output shaft 22 to a pump hub 50 to effectively lock-up the coupling to provide a mechanical drive to the sun gear 38 of the first gear set and through hub 54 the ring gear 44 of the second gear set. The turbine 15 drives the sun gear 38 and ring gear 44 through shaft 22 when first gear is engaged. The forward clutch 51 has plates 55 mounted on a drum 56 driven by the rotary hub 57 drive connected to hub 50. The hub 57 has a cylinder 58 formed therein for piston 59. On the supply of fluid by lock-up apply line 281 to the cylinder 58, the piston 59 engages the plates 55 and the plates 61 which are connected by a hub 62 to the coupling output shaft 22. Fourth speed clutch 63 connects the pump hub 50 to the secondary input shaft 64 which drives the sun gears 43 and 48 of the second and third gear sets and cooperates with clutch 51 to lock all transmission units for 1:1 drive to the output 99. The fourth speed clutch 63 has an input drum 66 formed as a continuation of drum 56 to drive input plates 67. The output plates 68 are connected by drum 69 and hub 71 to input shaft 64. The hub 71 has a cylinder 72 formed therein for the piston 73 and on the supply of fluid to the cylinder by fourth clutch apply line 432, piston 73 engages the plates to effect a drive from the pump hub 50 to the secondary input shaft 64 to drive sun gears 43 and 48. The shaft 64 may also be held by the third speed brake 76 which has fixed plates 77 and rotary plates 78 drive connected through drum 69 and hub 71 to shaft 64 to hold shaft 64 and sun gears 43 and 48. When fluid is supplied by third apply line 436 to the cylinder 79 formed in housing 19 to move the piston 81 to apply plates 77, 78 the brake 76 is engaged to hold the shaft 64 and the sun gears 43 and 48. The second speed brake 82 has a plurality of fixed plates 83 fixed to the housing 19 and rotary plates 84 connected by a hub 85 to the carrier 47 of the third gear set. When fluid is supplied by second apply line 419 to the cylinder 86 formed in housing 19, piston 87 moves to engage the plates 83, 84 and holds the carrier 47. The first and reverse brake 89 has a plurality of fixed plates 91 secured to housing 19 and rotary plates 92 drive connected to ring gear 39. When fluid is supplied by first speed brake apply line 309 to the cylinder 93 formed in housing 19 to move the piston 94 and engage plates 91, 92 the ring gear 39 of the first gear set is held.

In forward drive with clutch 51 released the coupling provides a slipping connection between the input shaft 10 and the sun gear 38. This permits the power turbine of engine 9 to rotate when the vehicle is stationary. However, when the transmission is in reverse, the power turbine is stalled when the vehicle is stationary. When the vehicle is moving in reverse the pump 14 and turbine 15 of the coupling rotate in opposite directions since the pump is driven forward by the engine 9 and the turbine is driven in reverse by the ring gear 44 and the sun gear 38.

CONTROLS

The brakes and clutches are engaged as indicated by X on the following chart and the others disengaged to provide four, forward speeds and reverse.

| Drives | Brakes | | | Clutches | |
|---|---|---|---|---|---|
|  | 89 | 82 | 76 | 63 | 51 |
| R | X |  |  | X |  |
| 1 | X |  |  |  | as desired |
| 2 |  | X |  |  | as desired |
| 3 |  |  | X |  | X |
| 4 |  |  |  | X | X |

FLUID SUPPLY

Figure 6:
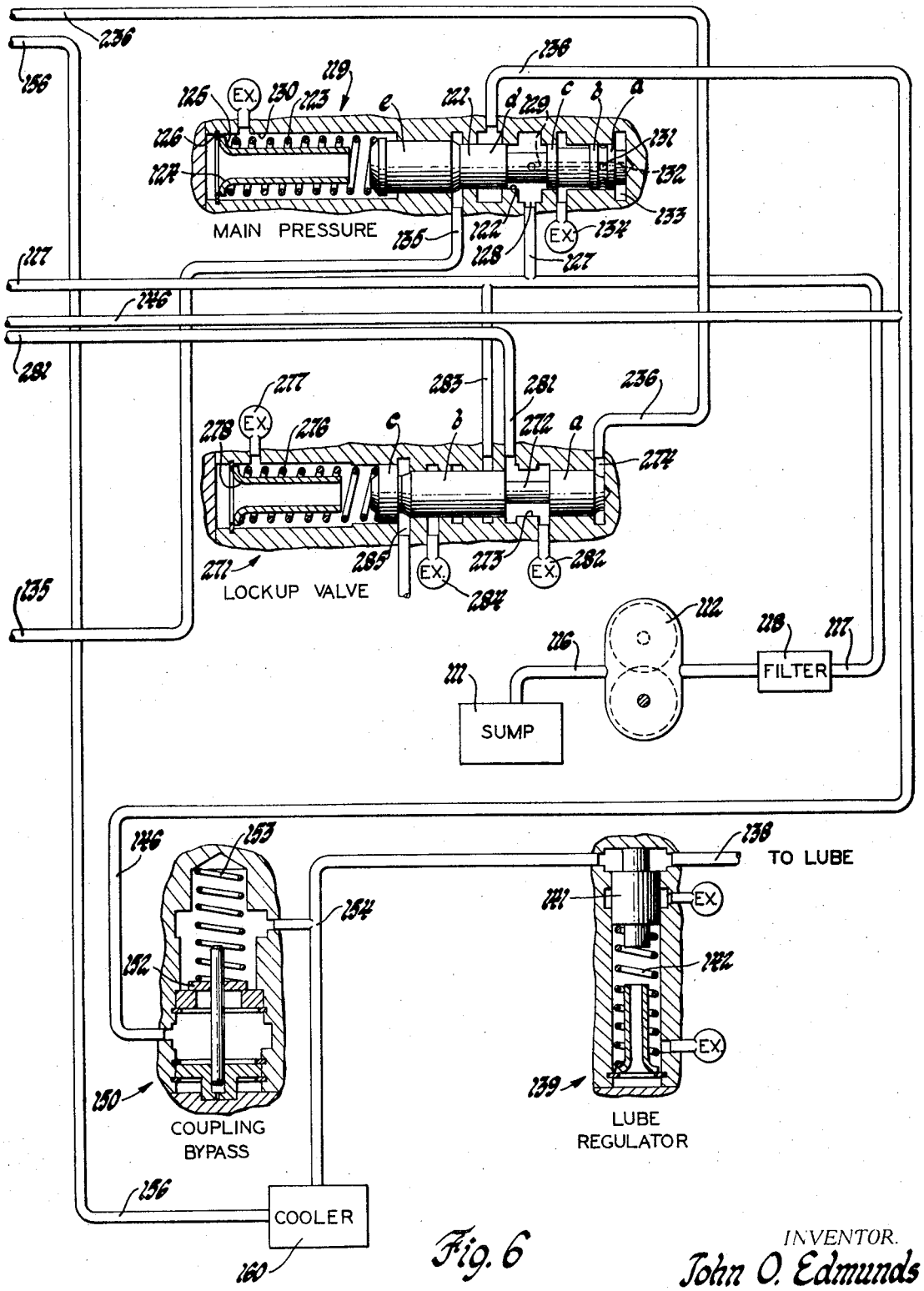

Referring to FIG. 6, the fluid exhausted from the control and lubrication system collects in the sump 111 in the lower portion of the transmission housing. A gear pump 112 draws fluid through the suction filler 118 and line 116 and delivers fluid to the main line 117 and is regulated by the main pressure regulator valve 119. The main pressure regulator valve 119 has a valve element 121 having lands a, b, c, d, of equal diameter and a larger land e located in a stepped bore 122. The valve element 121 is biased to the closed position shown by a spring 123 mounted on a combined spring seat and stop element 124 which is a tubular member to limit valve movement and spring compression which has a flared end 125 providing a seat for the spring and abutting snap ring 126 to retain the seat element and spring in spring chamber 130 vented to exhaust. The main line 117 has a branch 127 connected between the lands c and d and through port 128 and the bore 129 through the valve to the port 131 between the lands a and b and through a restriction to the port 132 at the end of the valve element to provide hydraulic bias in chamber 133 opposing the spring to regulate the main line pressure at a predetermined value. Regulated pressure is supplied by port 132 to the space between the lands a and b to prevent leakage from chamber 133 to the space between lands b and c vented by exhaust 134. The forward knockdown pressure line 135 is connected at the step between lands d and e to reduce the regulated pressure to i.e. 150 psi in all forward drive positions while pressure in reverse drive is higher, i.e. 250 psi. Excess main line pressure in line 117 and chamber 133 moves the regulator valve element 121 to the exhaust position exhausting branch 127 to overage line 136 which feeds the coupling through a coupling feed line 146. The cooler outlet line 154 is connected to the lubrication lube regulator valve 139 which has a valve element 141 biased to a closed position by a spring 142 and is closed when the overage pressure does not exceed a low value to first supply lubrication line 138. When the lubrication pressure is sufficient, overage pressure exceeds a predetermined value, i.e., 40 psi and the valve 139 opens to connect cooler outlet line 154 to exhaust. When coupling feed pressure exceeds a predetermined low pressure, excess fluid in coupling feed line 146 moves valve element 152 against the bias spring 153 of coupling bypass valve 150 and lube pressure to exhaust excess coupling feed pressure to the cooler outlet line 154. The coupling outlet line 156 is connected in FIG. 6 through the cooler 160 to the cooler outlet line 154 where the pressure is limited by the lube regulator valve 139.

DETENT VALVE

Figure 5:
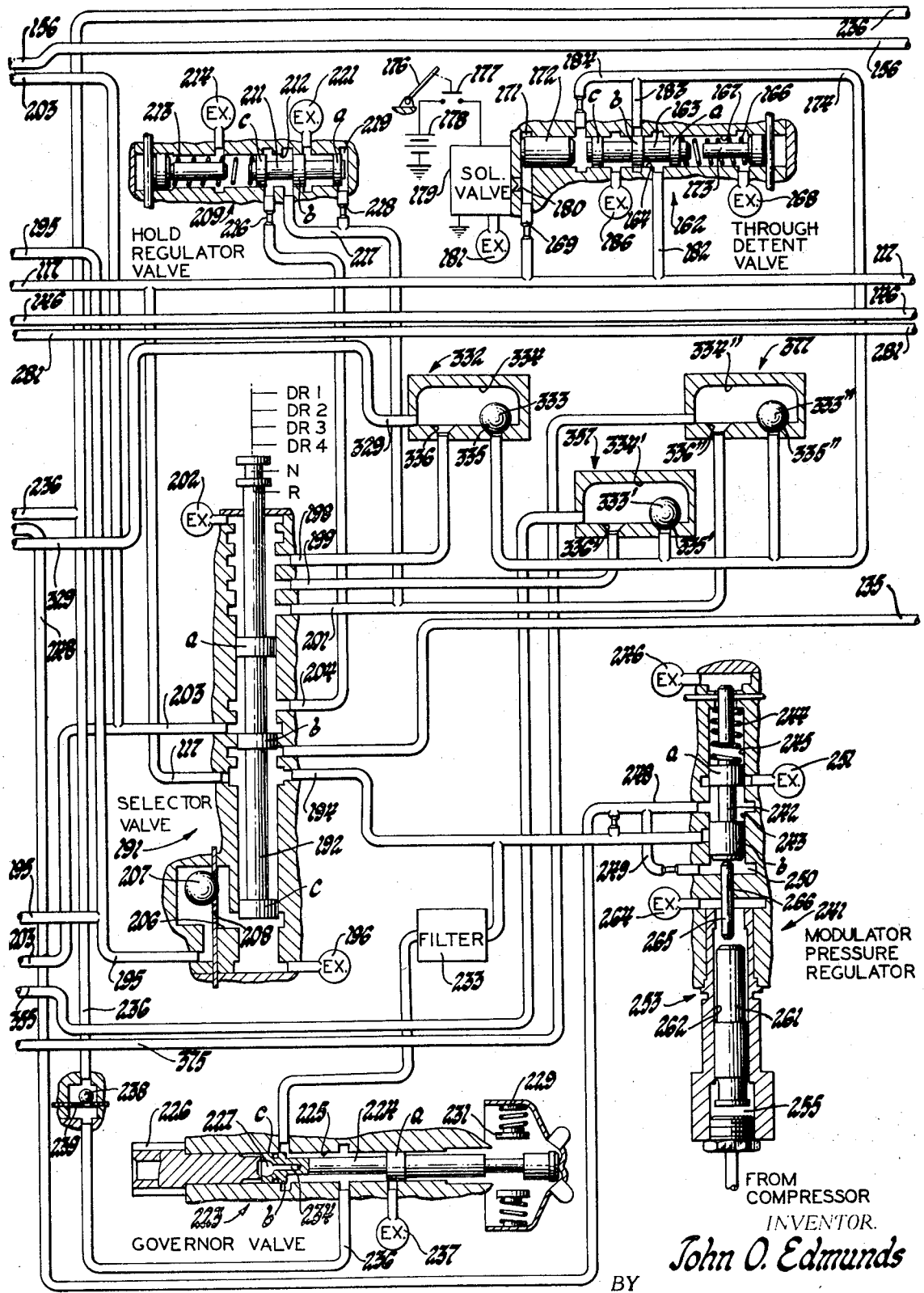

A through detent valve 162, FIG. 5, which has a valve element 163 having equal diameter lands a, b and c located in a bore 164 and is biased in an opening direction by a spring 166 located in the spring chamber 167 vented by exhaust 168. Main line pressure 117 is connected through restricted passage 169 to a chamber 171 to act on the inactivating piston 172 to normally engage valve element 163 and hold it in the extreme right position against the stop element 173 so that the through detent valve does not deliver pressure to the detent line 174. When the throttle pedal 176 is past the full throttle position, it closes switch 177 connecting a grounded power source 178 to the solenoid valve 179 which opens the port 180 to exhaust 181 to vent fluid in chamber 171 to permit the detent valve 162 to regulate pressure. The regulated pressure supplied from main line 117 via branch 182 to the space between lands a and b to the branch 183 of detent line 174 and through restricted branch 184 to the space between the piston 172 and valve element 163 to initiate regulation of detent line pressure at a predetermined low value i.e. 38 psi, determined by spring 166. Excess pressure will move the valve element 163 against the spring 166 and connect the detent line to exhaust 186.

SELECTOR VALVE

The manual selector valve 191 has a valve element 192 having equal diameter lands a, b and c. In all valve positions, main line 117 is connected to the signal feed line 194. In neutral the main line is also connected to the forward knockdown line 135. The reverse selector line 195 is connected to exhaust 196. The drive one line 198, drive two line 199 and the drive three line 201 are connected to exhaust 202. The drive four line 203 is connected via hold feed line 204, hold regulator valve 209, hold pressure line 217, drive three line 201 to exhaust 202.

On movement of the selector valve 192 to the reverse position, land c closes exhaust 196 and opens port 206 to connect main line by fast feed ball check valve 207 and slow return restriction 208 to the reverse selector line 195. The forward knockdown line 135 is also exhausted via hold feed line 204. On movement of the selector valve to drive four position, DR4, reverse is exhausted and in addition to feeding feed line 194 and forward knockdown line 135 as in neutral, the drive four line 203 is fed while the other drive lines remain connected to exhaust as in neutral. In drive three position, DR3, the main line 117 additionally feeds the hold feed line 204 and blocks the exhaust of drive three feed line 201. In drive two position, DR2, the main line feeds the same lines and interconnects drive two feed line 199 and drive three feed line 201. In drive one position, DR1, the main line feeds the same lines and the drive one feed line 198, drive two feed line 199 and drive three feed line 201 are interconnected.

HOLD REGULATOR VALVE

The hold regulator valve 109 regulates the pressure distributed by the drive one, two and three feed lines and has a valve element 211 having equal lands $a$, $b$ and $c$ located in a bore 212. A spring 213 located in a spring chamber vented by exhaust 214 biases the valve 211 to the open position shown. In the open position shown, the hold feed line 204 is connected through restriction 216 to the space between lands b and c and supplies hold pressure supply line 217 which is connected to the drive three line 201. This hold pressure supply line 217 is also connected by restricted passage 218 to the closed chamber 219 at the end of bore 212 to act on land a of the valve element to oppose the spring bias. The pressure in chamber 219 moves the valve against the spring to connect line 217 to exhaust 221 or feed line 204 to regulate hold pressure at a valve intermediate main line pressure and detent pressure, i.e. 45 psi.

GOVERNOR

The governor valve 223 has a valve element 224 having equal lands $a$, $b$, and $c$ mounted in a bore 225 and is rotatably driven by a gear 226 driven from output shaft 99 by a spline connector 227 which permits axial movement of the valve element 224 under the influence of the rotating governor weights 229 and secondary weights 231 which provide a stepped pressure varying with output or vehicle speed. Fluid pressure supplied by the signal feed line 194 through filter 233 is connected between lands a and b and by a passage 234 through the valve element to the end valve element 224 to act on the end of the valve element to move it to an exhausting position connecting governor signal line 236 to exhaust 237 against the opposing force of the governor weight. The force of the governor weight overcomes the pressure to move the valve to the left connecting signal feed line 194 to governor line 236 and closing exhaust 237. The one way check valve 238 permits fast flow of the governor signal pressure to the shift valves and the return restriction 239 only permits slow return flow so the governor pressure line has fluid flow to supply without pressure drop, the expanding governor pressure chambers when shift valves upshift and reduce return flow to prevent sharp reduction of governor pressure due to drive line shock.

MODULATOR PRESSURE REGULATOR

The modulator pressure regulator 241, FIG. 5, provides a pressure inversely proportional to torque demand and has a valve element 242 having equal lands a and b mounted in a bore 243. The spring 244 located in a spring chamber 245 vented by exhaust 246 biases the valve element to the open position connecting signal feed line 194 between the lands to the modulated signal line 248 which is connected by a restrictive passage 249 to the chamber 250 at the end of the bore 243 to act on the end of land b to bias the valve element to connect modulator line 248 between lands a and b to exhaust 251, to regulate the modulated signal pressure inversely proportional to engine load or the force delivered by compressor discharge actuator 253.

The modulator pressure regulator valve 241 is controlled by an actuator 253 consisting of an actuator stem 261 which is reciprocally mounted in a bore 262 in the end wall of the valve body which is vented by exhaust 264. A chamber 255 is adjacent the end of stem 261 and is connected to the compressor of the gas turbine to permit compressor discharging pressure, which is proportional to engine power developed, to act on the stem 261. The stem 261 engages a pin 265 reciprocally mounted in a bore 266 in the valve body to engage the valve element 242. The force of the actuator stem 261 is proportional to the compressor discharge and thus increases with increasing compressor discharge pressure and acts through the stem 261 and pin 265 on the valve element 242 and with the regulated pressure in opposition to the valve spring 244 to provide a regulated pressure inversely proportional to actuator force, or compressor discharge pressure.

LOCK-UP VALVE

The lock-up shift valve 271, FIG. 6, has a valve element 272 having lands a, b and c reciprocally mounted in a stepped bore 273. The governor pressure line 236 is connected to closed chamber 274 to act on the end of land a to bias the valve against the bias of spring 276 located in a chamber vented by exhaust 277 and having a stop and spring seat member 278. Port 285 between lands $b$ and $c$ is exhausted. In some transmission designs, it is desirable to have the lock-up valve shifted in drive one. In these transmissions the drive one line 198 is connected with the port 285 so that line pressure will upshift the lock-up valve. With the lock-up valve in a downshift position shown, lock-up apply line 281 is connected to exhaust 282 to disengage the forward lock-up clutch 51. This valve is upshifted by governor pressure in an upshifted direction and overcoming the bias of the spring in a downshift direction. The lock-up valve provides the shifts at a fixed output speed. In the upshifted position main pressure in lock-up feed line 283 is connected between the lands a and b of the upshifted lock-up valve to lock-up clutch apply line 281 to engage the lock-up clutch. The land b is slightly larger than land a so the main line pressure connected to the lock-up clutch provides a hysteresis force, so downshifts are at lower speeds. The exhaust 282 then being closed. The exhaust 284 permits leakage fluid to escape to prevent main line leakage affecting modulator pressure.

NEUTRAL-ONE SHIFT SIGNAL VALVE

Figure 4:
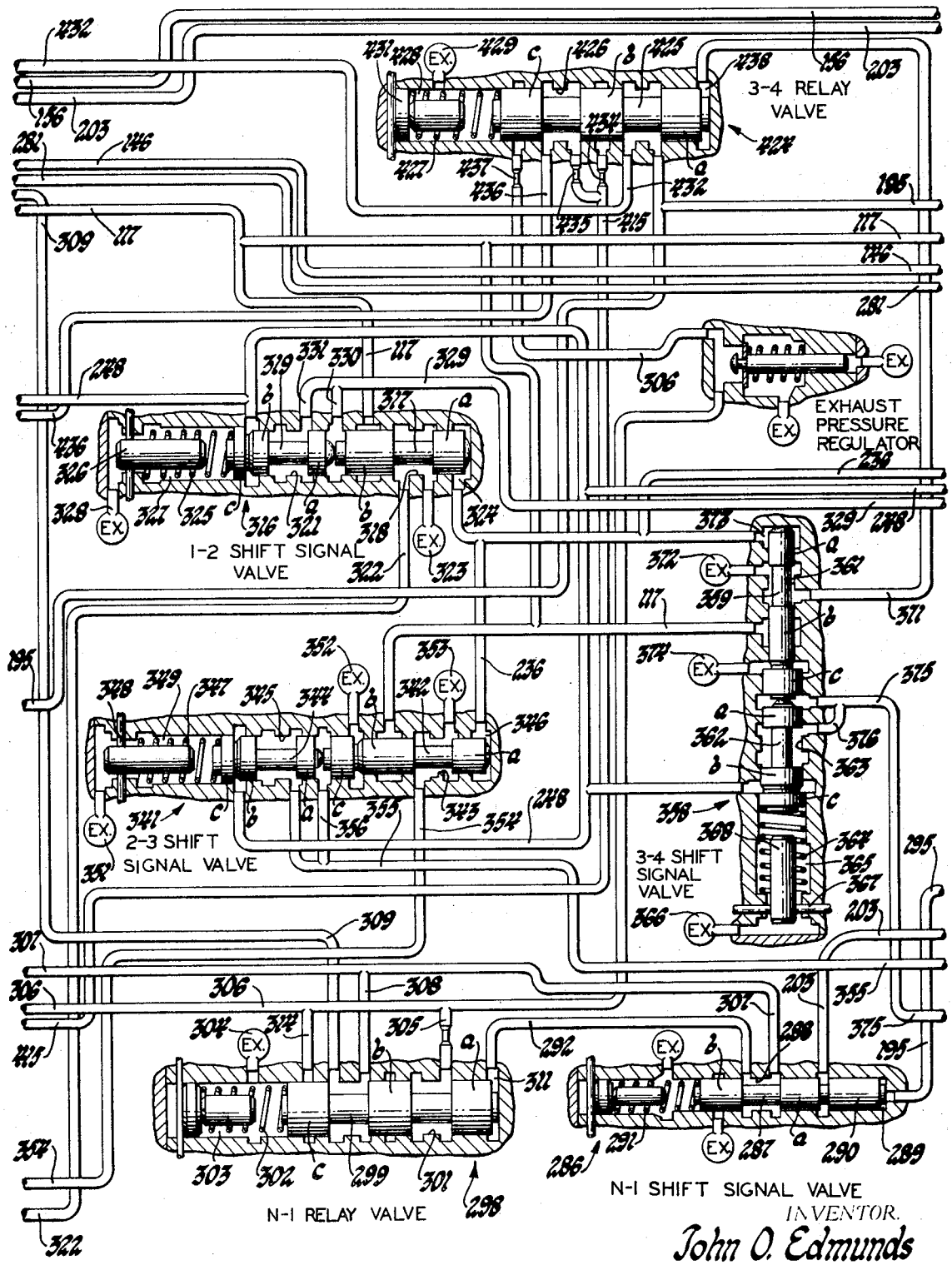

The neutral-one shift signal valve 286, FIG. 4, controls the neutral to first shift by controlling the engagement of the first brake 89. The shift signal valve 286 has a valve element 287 having equal diameter lands a and b slidably mounted in a bore 288 and a plug 290 slidably mounted in bore 288. The plug 290 and valve 287 are biased by reverse pressure from line 195 connected to chamber 289 at the end of bore 288 to act on the plug 290 or by drive four pressure in line 203 acting on land a between valve element 287 and plug 290 to move the valve element against the bias of spring 291 to exhaust the N-1 shift signal line 292 to permit engagement of the first and reverse brake 89 by the neutral-one relay valve 298. When the selector valve 191 is in neutral the spring 291, the lines 203 and 195 are exhausted and valve element 287 is biased by spring 291 to connect line 292 with pressure in line 307 to shift the neutral-one relay valve 298 to prevent engagement of brake 89.

NEUTRAL-ONE RELAY VALVE

The neutral-one relay valve 298, FIG. 4, has a valve element 299 having equal diameter lands $a$, $b$ and $c$ mounted in a bore 301 and biased to the first drive speed position by the spring 302 mounted in a spring chamber 303 vented by exhaust 304. With the valve element in the first drive speed position shown, the first apply line 309 is connected to branch 308 of line 307. Main line pressure is supplied from the one-two shift relay valve 378 via line 307 and its branch 308 between the lands $b$ and $c$ to the first speed apply line 309 which is connected to the first brake cylinder 93 to establish first speed drive. When fluid is supplied by the neutral-one shift signal valve 286 to the neutral-one shift signal line 292 to the chamber 311 at the end of valve element 299 acting on land a, the valve is moved against the spring bias to the neutral position connecting the first apply line 309 to branch 314 of exhaust line 306 while land b blocks branch 308 of line 307.

ONE-TWO SHIFT SIGNAL VALVE

Automatic shifting between first to fourth speed forward drives is provided by a speed and engine load signal controlled shift signal valve, one for each speed change, each having an associated relay valve. The shift and relay valves for each speed change are similar but are individually described with the connections and then the basic function of operation is discussed.

The one-two shift signal valve 316, FIG. 4, has a valve element 317 having land $a$ and larger land $b$ in a stepped bore 318 and a control element 319 having lands $a$, $b$ and $c$ of increasing diameter from $a$ to $c$ mounted in a stepped bore 321. The land $b$ of valve element 317 is larger than land a so that when the valve is moved from the downshift position shown in FIG. 4 to the upshift position connecting main line 117 to the one-two signal line 322 for a shift to second speed, there is an added hysteresis force in an upshift direction on the valve. In the downshift position shown, the one-two signal line 322 is connected to exhaust 323 and this hysteresis force is dropped. In both downshift and upshift positions, governor pressure from line 236 enters chamber 324 at the end of bore 318 and acts on land $a$ of valve element 317 in an upshift direction. Also modulator pressure line 248 is connected to the stepped bore between the large land $c$ and the smaller land $b$ of control element 319 to also provide an upshift direction force. Both the governor and modulator upshift direction forces are opposed by the downshift direction force of spring 325 which is mounted on a suitable spring seat and stop assembly 326 in a spring chamber 327 vented by exhaust 328. When governor pressure and modulator forces overcome the spring force, both valve elements upshift and the modulator pressure from line 248 is also connected between land $a$ and $b$ of the control valve element 319. Since land $b$ is larger than the land $a$ there is an additional area and upshift force after upshifting to control the downshift. The two-one downshift line 329 may supply either hold pressure from the drive one line 198 of detent pressure from detent line 174 and is connected via branch 330 to hold the shift valve element 317 in the downshift position when downshifted or via branch 331 when the valve element is upshifted to downshift the shift valve element at a predetermined speed. The regulated hold pressure supplied is insufficient to downshift above a predetermined speed for a proper shift.

The two-one downshift line 329 is supplied in a detent position of the throttle pedal by detent valve 162 and detent line 174. If the slightly higher hold pressure from hold regulator valve 209 is connected by the selector valve 191 in the drive one position to drive one line 198, the one-two shuttle valve 332 blocks detent line 174 and connects hold pressure from drive one line 198 to downshift line 329. The shuttle valve 332 has a ball 333 located in a chamber 334 having a bottom surface having depressed seat port 335 at the entry of detent line 174 to the chamber and closely adjacent depressed seat port 336 at the entry of drive one line 198. The downshift line 329 is connected to chamber 334 by a port that is wide and positioned so it cannot be blocked by ball 333. When pressure is supplied to one of seat ports 335 or 336, the ball will seat in and close the other. The chamber has a rounded upper surface particularly at the ends to guide the ball into the seat ports and the height of the chamber between the seat ports should be only slightly greater than the ball diameter.

TWO-THREE SHIFT SIGNAL VALVE

The two-three shift signal valve 341 has a valve element 342 having lands $a$, $b$ and $c$ of increasing diameter from $a$ to $c$ in a stepped bore 343 and a control element 344 having lands $a$, $b$ and $c$ of increasing diameter from $a$ to $c$ in a stepped bore 345. In both the up and down shift positions of the shift valve, the governor pressure line 236 is connected to the chamber 346 to provide an upshift direction force and the modulator pressure line 248 is connected between the lands $b$ and $c$ of control element 344 to act on the excess area of land $c$ to provide an upshift force against the downshift direction force of spring 347 mounted on a seat assembly 348 in the spring chamber 349 which is vented by exhaust 351. Exhaust 352 vents a space between lands $b$ and $c$ of valve element 342. Exhaust 353 exhausts the two-three signal line 354 with the valve element 342 in the downshift position shown so there is no two-three signal pressure for a shift to third. On an upshift exhaust 353 is closed and main line 117 is connected to the two-three signal line 354. With the shift valve 342 and control valve 344 in the downshift position shown or upshift position, governor pressure from line 236 in chamber 346 acting on land a and modulator pressure from line 248 acting on land c of control valve 344 provides an upshift direction force against the downshift force of spring 347 to provide upshifts. When the governor pressure and modulator pressure overcome the spring force, the shift valve 342 and control valve 344 move to the upshift position. The main line pressure acting on land b which is larger than land a provides an upshift hysteresis force and modulator pressure acting on land b provide an added upshift force to provide downshifts at speeds lower than upshift speeds. The three-two downshift line 355 in the downshift position of the shift valve and the branch 356 in upshift position of the shift valve is connected to the valve bore between the shift valve element 342 and the control valve element 344, for downshifting the shift valve element when supplied with hold or detent pressure. The detent pressure line 174 and the hold pressure via drive two line 199 are connected to the two-three shift shuttle valve 357 which has the same structure as the one-two shuttle valve 332 and thus has the same reference numbers primed. When the throttle pedal is in detent position providing detent pressure in line 174 shuttle valve 357 connects this pressure to the three-two downshift line 355 but if the selector valve 191 is in drive three or two positions providing hold pressure in line 199 this pressure is supplied to downshift line 355 and detent pressure blocked.

THE THREE-FOUR SHIFT SIGNAL VALVE

The three-four shift signal valve 358, FIG. 4, has a shift valve element 359 having lands a, b and c located in a stepped bore 361 and a control valve element 362 having lands a, b and c in a stepped bore 363. The lands of both valve elements have sequentially increasing diameters from a to c. Both valve elements are biased to the downshift position by a spring 364 located in a spring chamber 365 vented by exhaust 366. The spring is seated on an adjustable seat 367 and having a stop pin 368 limiting valve movement. In the downshift position, shift valve element 359 blocks main line 117 and connects the three-four shift signal line 371 to exhaust 372. In this position governor pressure acting in chamber 373 on the land a of valve element 359 and modulator pressure line 248 acting on the land c of control valve element 362 provide a force in the upshift direction against the downshift direction force of the spring 364. When governor and modulator pressure overcome the spring force, the valve elements upshift. In upshift position land a of valve element 359 blocks exhaust 372, main line 117 is connected to the three-four shift signal line 371 and the main line pressure between lands a and b acts on the larger area of land b to provide a primary additional upshift hysteresis force. In addition, modulator pressure also acts on land b of control valve element 362 to provide an additional upshift force causing downshifts at lower speeds. The exhaust 374 vents the valve bore between the downshift line 375 and main line 117. Hold or detent pressure in three-four down-shift line 375 and its branch 376 is connected between the valve elements when in the downshift and upshift position respectively to position valve element 359 in a downshift position at proper speeds. When detent pressure is supplied to line 174 the three four shuttle valve 377 connects it to four-three downshift line 375 unless the selector valve is in drive one, two or three position and supplies the higher hold pressure to drive three line 201 which is then connected to downshift line 375 and detent pressure is blocked. This shuttle valve 377 has the same structure and operation as shuttle valve 332 so the parts have the same reference numerals double primed.

ONE-TWO RELAY VALVE

The one-two relay valve 378, FIG. 3, has a valve element 379 having equal diameter lands a, b and c located in a bore 381 and is biased to the first speed position shown by a spring 382 seated on the spring seat 383 located in a closed chamber 384. The chamber 384 is connected by a port 386 and a passage 387 through the valve element to a port 388 located in a groove 389 in the land a to exhaust the chamber in the upshift position. Main line pressure supplied from the selector valve 191 to the drive four line 203 is always connected through restriction 391 in the priority valve 392 to the priority main line 393. The priority valve has arranged in parallel with restriction 391 a relief valve having a valve element 394, closing port 395 under the bias of spring 396 in vented chamber 397 when the pressure in main line and drive four line 203 is insufficient for properly operating the transmission and open when the pressure is sufficient. The valve will close momentarily during shifts involving engagement of second, third and fourth in forward drives to maintain sufficient main line feed pressure to the modulator valve 241 and governor valve 223. The restriction 391 provides an exhaust connection in neutral position of the selector valve.

Relay valve 378 in the first speed position shown, connects the one-two shift line 398 to exhaust line 306, blocks priority drive four line 393, connects the main line 117 via restriction 399 between the lands b and c to the line 307, blocks restricted branch 402 of exhaust line 306 at the land c and connects reverse drive line 195 from the manual selector valve adjacent land c to the spring chamber 384 which is closed since passage 387 is blocked. When the one-two shift signal valve 321 provides pressure in the one-two signal line 322 to supply fluid to the closed chamber 401, valve element 379 is moved against the bias of the spring except in reverse to the second speed position. Then spring chamber 384 is connected via passage 387 to exhaust line 306, priority drive four line is connected to the one-two shift line 398, main line 117 is blocked by land b, the line 307 is connected via restricted branch 402 to exhaust line 306 and reverse line 195 is blocked by land c.

TWO-THREE RELAY VALVE

The two-three relay valve 406 has a valve element 407 having equal diameter lands a, b and c located in a bore 408 and biased by a spring 409 to the downshift or second speed position shown in FIG. 3. The spring is seated on a seat and pin assembly 411 in a chamber 412 vented by exhaust 414. When the relay valve is biased by the spring to the second speed position, the two three shift feed line 415 is connected between lands a and b via branch 416 to exhaust line 306, one-two shift line 398 has unrestricted branch 417 blocked by land b and the restricted branch 418 connected between lands b and c to the second brake line 419 and restrictive branch 421 of the exhaust line 306 is blocked by land c. When the two-three shift signal valve 341 supplies the two-three shift signal line 354 pressure to chamber 422, the two-three relay valve element moves against the spring 409 to the stop pin and exhaust branch 416 is blocked by land a. The one-two shift signal line 398 via branch 417 is connected to the two-three shift line 415, the restricted branch 418 is blocked by land b and the second brake line 419 is connected via restricted branch 421 to exhaust line 306.

THREE-FOUR RELAY VALVE

The three-four relay valve 424 has a valve element 425 having equal diameter lands a, b and c located in a bore 426 and is biased by a spring 427 to the third position shown in FIG. 4. The spring is located in the chamber 428 vented by exhaust 429 and seated on a seat and valve stop assembly 431. When the valve element 425 is biased to the third position shown by the spring 427, reverse drive line 195 is connected between the lands a and b to the fourth clutch lines 432, the two-three shift signal line 415 has restricted branch 434 blocked by the land b and restricted branch 435 connected between lands b and c to the third brake line 436 and the exhaust line 306 connected by restriction 437 is blocked by land c. When the three four shift signal valve 358 provides a signal pressure in the three-four shift signal line 371 to the chamber 438, this pressure acts on land a moving the valve to the fourth speed position. Then reverse drive line 195 is blocked by land a, two-three shift line 415 is connected by restrictive branch 434 to the fourth clutch line 432 and branch 435 is blocked by land b and the third brake line 436 is connected via restriction 437 to exhaust line 306.

TRIMMER REGULATOR VALVE

The trimmer regulator valve 441, FIG. 3, has a valve element 442 having equal diameter lands a, b, c and larger land d located in a stepped bore 443 and is biased to the feed position shown by a spring 444 seated on an abutment and stop pin assembly 446 located in a spring chamber 447 vented by exhaust 448. With the valve element 442 in the feed position shown, main line 117 branch 451 is connected between the lands b and c to the trimmer regulated pressure line 452 which is connected by branch 453 which may be restricted to the closed chamber 454 to act on the end of land a and oppose the spring bias and regulate the pressure. When the trimmer regulated pressure exceeds the regulated value, it will move the valve element 442 to the left connecting trimmer regulator pressure line 452 between lands a and b to exhaust 456. The modulator pressure line 248 is connected between the lands c and d to act on the unbalanced area of land d opposing the spring. Increasing modulator pressure provides a proportionately reduced trimmer regulator pressure. Since modulator pressure varies inversely with engine load and is a maximum at idle and reduces to zero at a high throttle position, the trimmer regulator pressure sure is low at idle or at low torque demand values and increases proportionately to increasing torque demand to a high torque demand where the highest trimmer regulator pressure is determined by the spring force and the area of land a of trimmer regulator valve element 442.

TRIMMER VALVES

The first and reverse drive trimmer valve 461 has a trimmer regulator element 462 having a small land a and large land b located respectively in small bore 463 and large bore 464. The first brake apply line 309 is connected to the end of the bore 463 and acts on land a to bias the valve to the right to the open position connecting first brake apply line 309 to exhaust 467 to reduce the pressure. First brake apply pressure from line 309 is also continuously connected through restriction 468 to the space 469 between the regulating valve element 462 and an actuator plug 471 which is shown seated on a stop member 472 fully compressing the spring 473 located in a closed chamber 474 having trimmer regulator pressure connected thereto at a port 475 below the stop and thus never blocked by plug 471. When line 309 is vented, spring 473 is extended with plug 471 engaging regulator valve element 462. On the initial supply of fluid to the first brake by first brake apply line 309, pressure acts on regulator valve element 462 and is regulated at a low pressure value determined by the trimmer regulator pressure which increases with increasing torque demand and the minimum spring force at full height in the valve assembly. At the same time fluid slowly flows through restriction 468 to fill and enlarge the space 469 to gradually separate the regulator valve element and plug so that the spring 474 is more and more compressed to gradually increase the regulated pressure at a rate determined by the restriction and spring rate until the maximum regulated pressure is provided with the valve elements in the position shown for gradual engagement of the friction devices. Then the pressure quickly increases to main line pressure. The valve will remain in this position until the first brake apply line 309 is exhausted and the valve will return to the initial position. The use of trimmer regulator pressure makes it possible to individually set the low pressure and rate of pressure rise to meet the requirements of each friction device with the same valve structure and springs fitting therein.

The second speed trimmer valve 476 similarly has a regulator valve element 477 having small land a and large land b respectively located in small bore 478 and large bore 479. Second brake pressure in line 419 is connected by branch 481 to the end of bore 478 and acts on the land a to move the regulator valve 477 and the plug 482 against bias of spring 483 and trimmer regulator pressure from line 452 and port 489 in chamber 487 to connect line 481 to exhaust 488 to reduce the pressure. The stop element 484 limits movement of the plug 482 and compression of the spring 483. When pressure is supplied via line 481 to the bore, it also flows through restriction 485 to the space 486 between the regulator valve and plug to enlarge this space to increase the spring force to gradually increase the pressure line first and reverse drive trimmer valve 461.

The third speed trimmer valve 496 has the same construction and function. Primed numbers from the second speed have been used to indicate like parts. This valve controls the third brake apply line 436 pressure which is connected by branch 497 and acts on the land a' of regulator valve element 477' which moves to open exhaust 488'. The trimmer regulator pressure line 452 is connected to port 489'. The fourth clutch trimmer valve 501 is similar to the above trimmer valves and functions in the same way and thus the same reference numerals with double primes have been used. The fourth clutch trimmer valve 501 regulates the fourth clutch pressure in line 432 and exhausts the excess to exhaust 488" and is controlled by trimmer regulator pressure from line 452 connected to port 489".

OPERATION

When the engine driving this transmission is running, the transmission input driven pump 112, FIG. 6, supplies fluid under pressure to the main line 117 which is regulated at a normal line pressure value, i.e. 150 psi when the transmission is in forward drive and forward drive knockdown pressure is supplied via line 135 to the regulator valve and at a higher reverse drive pressure i.e. 250 psi in reverse drive when this knockdown pressure is not supplied. The regulator valve exhaust line 136 is connected through coupling feed line 146 and coupling bypass valve 150 to the lubrication line 138 which lubricates the transmission gearing.

In neutral position, the manual selector valve 191 supplies fluid to the forward knockdown line 135 and the signal feed line 194 and the other lines, reverse 195, first 198, second 199 and third 201 drive lines are connected to exhausts 196 or 202 directly, while the drive four line 203 is connected to the hold feed line 204 and both are exhausted via the hold regulator valve 209 and the drive three feed line 201 to exhaust 202. As explained above, the trimmer regulator valve 441 will supply trimmer regulator pressure to line 452, the modulator pressure regulator valve 241 will provide modulator pressure in line 248 inversely proportional to engine load and the transmission output governor valve 223 will provide a governor signal in line 236 that is a function of output speed. The hold pressure regulator valve is not supplied and thus there is no hold pressure in line 217 and there is no detent pressure in line 174.

Normally when the selector valve is in neutral position the output of vehicle driven thereby will be stationary or nearly so and the engine is running to pressurize the system as pointed out above, the governor pressure and modulator pressure will be insufficient to overcome the downshift bias of the springs so the one-two, two-three and three-four shift signal valves 316, 341 and 358 will be in the downshift position connecting the first speed apply one-two, two-three and three-four shift signal lines 322, 354 and 371 to exhausts 323, 353 and 372 respectively. The main line 117 is directly connected to each shift signal valve and blocked by land b thereof. Since there are no shift signal pressures the one-two, two-three and three-four relay valves 378, 406 and 424 are spring biased to the downshift or lower speed position. Since there is no pressure in reverse line 195 or drive four line 203 the N-1 shift signal valve 286 is spring biased to the neutral position and the N-1 relay valve 298 is pressure biased to the neutral position so that signal line 309 is connected to exhaust 314.

If the output or vehicle is coasting at higher speeds, with the selector valve 191 inadvertently in neutral and the engine running the automatic output governor and modulator pressure control system will function as during automatic shifting described below to position the shift signal valves and relay valves in accordance with speed and torque demand. When the one-two relay valve 378 upshifts, first brake apply line 309 is connected by the neutral-one relay valve 298 to the line 307 which is connected by the one-two relay valve 378 to exhaust 402 to disengage the first brake 89. Since drive four line 203 is exhausted at the selector valve in neutral position, the second and third brakes and fourth clutch cannot be applied. Thus on movement of the selector valve to a drive position, the forward clutch will be engaged and the priority valve 392 will supply fluid to then engage the drive speed selected by the automatic controls. The drive and coasting shift engagement sequence is the same, the drive always being completed by the first, second third or fourth speed engagement device.

On shifting the manual selector valve 191 to the drive four position DR4 at the output speeds and engine load values insufficient to upshift the one-two shift signal valve 316, the main line 117 is directly connected to the drive four line 203 to supply fluid to the N-1 shift signal valve 286 to vent the pressure in line 292 to permit the N-1 relay valve 298 to assume the first speed position to engage the first brake 89. Since the coupling is driving the sun gear 38 the transmission will drive forward in first gear. Thus when the output or vehicle is standing the first brake 89 is engaged and the power turbine is permitted to rotate since the coupling provides a slipping connection between the engine and the gear train. The drive four line supplies fluid to the priority valve 392 which feeds the drive four priority line 393 which in the first speed position of the one-two relay valve 378 is blocked by land b.

The other drive establishing devices are exhausted to disestablish the other drives. The second speed brake apply line 419 is connected by the downshifted two-three relay valve 406 to one-two shift feed line 398 which is connected by downshifted one-two relay valve 378 to the exhaust line 306 for disestablishing the second speed brake 82. The third speed brake apply line 436 is connected by the downshifted three-four relay valve 424 to the restricted branch 435 and two-three shift feed line 415 which is connected by the downshifted two-three relay valve to the exhaust branch 416 and line 306 to disengage third brake 76. The fourth speed clutch apply line 432 is connected via the downshifted three-four relay valve 424 to the reverse line 195 which is connected to exhaust at the selector valve 191 to disengage the fourth clutch 63. The forward clutch 51 is exhausted via the lock-up valve 271.

When the speed of the vehicle has increased sufficiently, the governor pressure in line 236 will cause the lock-up valve 271 to upshift. When this occurs, the lock-up apply line 281 will be connected to main line 117, thereby pressurizing the forward clutch 51. With the lock-up clutch 51 engaged the drive from the engine bypasses the coupling to directly drive the sun gear 38 and ring gear 44. Thus, the coupling is effective only during initial acceleration of the vehicle until lock-up occurs.

When the speed of the vehicle increases, so that governor pressure in line 236 upshifts the one-two shift signal valve 316 against the spring bias reduced by modulator pressure from line 248, the exhaust 323 is closed and the main line 117 supplies pressure to the one-two shift signal line 322 which acts in chamber 401 to upshift the one-two relay valve 378 from the downshifted position against the spring bias to the upshifted position. Upshifted one-two relay valve 378 connects the low-one shift line 307 which had engaged first speed via the N-one relay valve 298 to the exhaust line 306 to disengage first speed and connects the priority main line 393 between lands a and b to the one-two shift feed line 398 which is connected by the restricted branch 418 between the lands *b* and *c* of the downshifted two-three relay valve 406 to the second brake apply line 419 for engagement of the second speed.

At a higher speed, governor pressure similarly upshifts the two-three shift signal valve 341 which will disconnect the second, third shift signal line 354 from exhaust 353 and connect it to main line. The second-third shift signal line 354 is connected to chamber 422 of two-three relay valve 411 to upshift this valve to the upshift position connecting the second brake apply line 419 by restricted exhaust 421 to the low pressure exhaust line 306 and connects the unrestricted branch 417 of the one-two shift line 398 to the second-third shift feed line 415 which is connected via restricted branch 435 and between the lands *b* and *c* of downshifted three-four relay valve 424 to the third brake apply line 436 to engage third speed drive.

At a still higher speed the governor pressure will upshift the three-four shift signal valve 358 to disconnect the three-four shift signal line 371 from exhaust 372 and connect it to main line 117 to supply pressure to the chamber 438 to upshift the three-four relay valve 424. This upshifted relay valve will then connect third brake apply line 436 to restricted exhaust 437 and the low pressure exhaust line 306 and connect the two-three shift feed line 415 via restriction 434 to the fourth clutch apply line 432 to engage fourth speed drive.

Since the drive four line via the priority valve 392 and priority drive four line 393 sequentially feeds the one-two, two-three and three-four relay valves only one of the first, second, third and fourth speeds can be engaged and failure of any shift relay valve to upshift will prevent engagement of all higher speed drives. Since the shift signal valves upshift sequentially with increasing speeds, the drives will be changed in this sequence.

A reduction of governor pressure and/or modulator pressure will effect a downshift of the shift signal valves sequentially, the three-four shift signal valve, the two-three shift signal valve and then the one-two shift signal valve to provide the reverse of the above described upshifting operation and thus provide downshifting in this sequence.

When the throttle pedal is in the through detent position which may be either just prior to, at, or just beyond full throttle position through detent valve 162 supplies to the detent line 174 fluid at a regulated pressure to each of the four-three shuttle valve 377, three-two shuttle valve 357 and two-one shuttle valve 332. If the hold feed pressure supplied by line 204 in the manual valve via the drive three line 201, drive two line 199 and drive one line 198 respectively is present in any of these valves the detent pressure being lower will be ineffective and remain blocked. However, if the hold feed pressure is not present in any of these valves, the detent pressure will, as explained above, move the ball 333 from the detent line 335 to the hold feed pressure seat 336 and the detent pressure will be connected to the downshift line connected to that shuttle valve. As pointed out above, the four-three down-shift line 375, the three-two downshift line 355 and the two-one downshift line 329 are respectively connected to the three-four shift signal valve 358, the two-three shift signal valve 341 and the one-two shift signal valve 316 and will provide up and downshifts of each of these shift valves at a higher speed than the normal shift speeds and remove the normal downshift bias by the spring modified by modulator pressure.

Movement of the manual selector valve 191 to the drive three position DR3, in addition to supplying the previously supplied signal feed line 194, forward knockdown line 135 and drive four line 203 also feeds the hold feed line 204 and blocks the exhaust of the drive three feed line 201. Thus the hold pressure is regulated by the hold regulator valve 291 when supplied with main line pressure by the hold feed line 204 and supplies hold pressure via line 217 to the drive three feed line 201 which is connected by four-three shuttle valve 377 regardless of the presence or absence of detent pressure to the four-three downshift line 375 which will downshift the three-four shift signal valve at a higher speed than detent pressure. The shift valves control the slave valves for shifting the transmission as in automatic drive but up and downshifts from third to fourth speed occur at a higher speed. Thus normal power driving would be limited to first to third speeds but coast upshifts to fourth are permitted.

Movement of the manual selector valve 191 to the drive two position DR2 will additionally interconnect the drive three line 201 to supply hold pressure to the drive two line 199 which will be connected by the three-two shuttle valve 357 to the three-two downshift line 355 which similarly acts on the two-three shift signal valve 341 to control the two-three relay valve 406 for shifting the transmission at a higher speed than detent shifting, so normal power one-two shifts are provided with coast upshifts to third and fourth.

Movement of the manual selector valve 191 to the drive one position DR1 additionally connects hold pressure from drive three feed line 201 to the drive one line 198 which is connected by the two-one shuttle valve 332 to the two-one downshift signal line 329 which acts on the one-two shift signal valve 316 to control the one-two relay valve 378 to shift the transmission between first and second speeds at higher speeds than the detent downshift to normally hold first speed but permit coast upshifts. As mentioned above, line 198 may also be connected at port 285 to engage the lock-up clutch.

In order to make a shift to reverse the modulator valve must be first moved to neutral, placing the control system in the above described neutral condition, and then to reverse R. In the reverse position R the selector valve 191 exhausts the drive four line 203 and forward knockdown line 135 through the hold feed line 204, the hold regulator valve 209 and drive three line 201 to exhaust 202. Exhausting the forward knockdown line 135 causes main pressure regulator valve 119 to increase main line pressure in line 117 to a higher value, i.e., 250 psi. The forward lock-up clutch 51, the second brake 82 and the third brake 76 are exhausted. It also exhausts the normal forward drive feed through the relay valves, which through the two-three shift line 415 with the three-four relay valve 424 upshifted feeds the fourth clutch apply line 432 or when downshifted the third brake apply line 436. To establish reverse drive three-four relay valve must be in the downshifted or third speed position. Then the selector valve 191 in reverse position connects main line 117 to reverse line 195, which with the three-four relay valve 424 in the downshift position is connected to the fourth clutch apply line 432 to engage the fourth clutch. In addition to establishing reverse the first brake 89 must be applied. Pressure in line 195 upshifts the N-1 shift signal valve 286 to exhaust the pressure bias on the N-1 relay valve 298, thereby directing fluid pressure in line 307 to first apply line 309. Of course, if the 1-2 relay valve 378 is up-shifted at this time, line 307 will be exhausted through line 306 so that reverse drive cannot be engaged when the vehicle is moving forward in the second or higher gear ratio.

In the above description, references to a direction of the valve on the drawing as right or left is merely for convenience and it will be appreciated that the location and relative arrangement of the valves is not important but that they may perform the above described functions in any position.

It will be appreciated that the invention may be used in the above described preferred embodiment and modifications thereof.

I claim:

1. A transmission and control comprising: an input shaft; an output shaft; multi-ratio planetary gearing means drivingly connected between said input and output shafts including selectively engageable drive establishing means for providing a plurality of drive ratios between said input and output shafts including four forward ratios, a reverse ratio and a neutral condition; fluid drive means operatively connected between said input shaft and said planetary gearing means for providing a fluid drive to said planetary gearing means when one of the forward ratios is effective; selectively engageable lock-up clutch means in parallel drive transmitting relation with said fluid drive means for providing a mechanical drive to said planetary gearing means in all other of the forward drive ratios; one of said selectively engageable drive establishing means being engaged to provide a reaction member in said planetary gearing means in both said one forward ratio and said reverse ratio; another of said selectively engageable drive establishing means being engaged in the reverse ratio to directly connect said input shaft to said planetary gearing means to provide a mechanical drive to said planetary gearing means; and control means for controlling the selective engagement of said drive establishing means and said lock-up clutch means.

2. The invention defined in claim 1 and said control means including manual valve means for selecting forward, neutral and reverse drive conditions in said transmission; relay valve means shiftable in response to movement of said manual valve means to the forward or reverse position; and shift valve means for controlling the engagement of said one drive establishing means during both the one forward ratio and the reverse ratio and being controlled by said relay valve means; said relay valve means being effective to direct control pressure to control said shift valve means in neutral and to exhaust the control pressure from said shift valve means in forward or reverse drive.

3. A transmission and control comprising: an input shaft; fluid coupling means for providing a fluid drive having an input member drive connected to said input shaft and an output member; and output shaft; multi-ratio planetary gearing means operatively connected between said output member and said output shaft for providing four forward speed ratios and a reverse speed ratio including first brake means selectively engageable for establishing a reaction member in said gearing means in the first forward speed ratio and the reverse speed ratio, second and third brake means selectively engageable for establishing reaction members in said gearing means for the second and third forward ratios respectively, first clutch means selectively engageable to drive connect said input and output members of said coupling means to provide a mechanical drive path to said gearing means in the second and third forward speed ratios, and second clutch means selectively engageable to drive connect said input member with said gearing means to provide a mechanical drive to said gearing means during the reverse speed ratio, and cooperating with said first clutch means to establish a direct mechanical drive to the gearing means in the fourth forward speed ratio; and control means for controlling the engagement of said clutches and brakes.

4. A transmission and control comprising: an input shaft; and output shaft; multi-ratio planetary gearing means including selectively engageable drive establishing means for providing a plurality of drive ratios between said input and output shafts including four forward ratios, a reverse ratio and a neutral condition; fluid drive means operatively connected between said input shaft and said planetary gearing means for selectively providing a fluid drive to said planetary gearing means in said forward ratios; selectively engageable lock-up clutch means in parallel drive transmitting relation with said fluid drive means for providing a mechanical drive to said planetary gearing means in the forward drive ratios; manual means for engaging said lock-up clutch means in one forward ratio; governor means for automatically engaging said lock-up clutch means in said forward ratios; one of said selectively engageable drive establishing means being engaged to establish a reaction member in said gearing means in both said one forward ratio and said reverse ratio; and another of said selectively engageable drive establishing means being engaged in the reverse ratio to directly connect said input shaft to said planetary gearing means to provide a mechanical drive to said planetary gearing means.

5. A transmission and control comprising: an input shaft; fluid coupling means for providing a fluid drive having an input member drive connected to said input shaft and an output member; an output shaft; multi-ratio planetary gearing means operatively connected between said output member and said output shaft for providing four forward speed ratios and a reverse speed ratio including first brake means selectively engageable for establishing a reaction member in said gearing means in the first forward speed ratio and the reverse speed ratio, second and third brake means selectively engageable for establishing reaction members in said gearing means for the second and third forward ratios, first clutch means selectively engageable to drive connect said input and output members of said coupling means to provide a mechanical drive path to said planetary gearing means in the forward speed ratios, and second clutch means selectively engageable to drive connect said input member with said gearing means to provide a mechanical drive to said gearing means and a speed differential in said coupling during the reverse speed ratio, cooperating with said fluid coupling to establish a split fluid-mechanical input drive to said gearing means in the fourth forward ratio, and cooperating with said first clutch means to establish a direct mechanical input drive to the gearing means in the fourth forward speed ratio; and control means for controlling the engagement of said clutch and brakes, said fluid coupling means providing a fluid drive to said gearing in said forward ratios when said first clutch means is disengaged.

* * * * *